United States Patent
Monroe et al.

(10) Patent No.: US 7,949,801 B2
(45) Date of Patent: May 24, 2011

(54) MAIN PROCESSOR INITIATING COMMAND TIMING SIGNAL VIA DMA TO COPROCESSOR IN ORDER TO SYNCHRONIZE EXECUTION OF INSTRUCTIONS

(75) Inventors: George T. Monroe, Seymour, CT (US); Linda Dore, Shelton, CT (US); Michael LePore, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 233 days.

(21) Appl. No.: 11/772,202

(22) Filed: Jun. 30, 2007

(65) Prior Publication Data

US 2008/0183912 A1    Jul. 31, 2008

Related U.S. Application Data

(60) Provisional application No. 60/887,592, filed on Jan. 31, 2007.

(51) Int. Cl.
*G06F 13/28* (2006.01)
*G06F 1/14* (2006.01)

(52) U.S. Cl. .............. 710/25; 710/22; 710/100; 710/48; 710/220; 710/58; 712/32; 712/35

(58) Field of Classification Search .................... 710/22, 710/220; 712/32, 35
See application file for complete search history.

(56) References Cited

U.S. PATENT DOCUMENTS

| | | | |
|---|---|---|---|
| 5,377,356 A * | 12/1994 | Molyneaux | 712/29 |
| 5,488,733 A * | 1/1996 | Molyneaux | 710/110 |
| 6,170,051 B1 * | 1/2001 | Dowling | 712/225 |
| 6,256,724 B1 * | 7/2001 | Hocevar et al. | 712/35 |
| 6,789,183 B1 * | 9/2004 | Smith et al. | 712/32 |
| 6,941,424 B2 * | 9/2005 | Bade et al. | 711/147 |
| 7,315,956 B2 * | 1/2008 | Jensen et al. | 713/500 |
| 7,698,590 B2 * | 4/2010 | Jensen et al. | 713/500 |
| 2002/0138778 A1 * | 9/2002 | Cole et al. | 713/330 |
| 2004/0187122 A1 | 9/2004 | Gosalia et al. | |

OTHER PUBLICATIONS

Renesas SH7720 Manual, Jan. 18, 2008—pp. 407-453, and 469-515.

* cited by examiner

*Primary Examiner* — Tammara Peyton
(74) *Attorney, Agent, or Firm* — George M. MacDonald; Charles R. Malandra, Jr.

(57) ABSTRACT

Coprocessor systems for using a main microprocessor DMA channel to write to a port to control a coprocessor system are provided. In certain examples, coprocessor systems are described using a main CPU counter to trigger a DMA channel to perform a single byte transfer to a port used to control coprocessor command timing.

7 Claims, 2 Drawing Sheets

MAIN PROCESSOR INITIATING COMMAND TIMING SIGNAL VIA DMA TO COPROCESSOR IN ORDER TO SYNCHRONIZE EXECUTION OF INSTRUCTIONS

CROSS REFERENCE TO RELATED APPLICATIONS

This application claims priority under 35 U.S.C. section 119(e) from Provisional Patent Application Ser. No. 60/887,592, filed Jan. 31, 2007, entitled COPROCESSOR COMMAND SYNCHRONIZATION USING A DMA CHANNEL, which is incorporated herein by reference in its entirety.

FIELD OF THE INVENTION

The present invention relates to synchronization systems and processes using a microprocessor DMA channel to write to a port to control a system and more particularly in certain microprocessor system embodiments to using a counter to trigger a DMA channel to perform a single byte transfer to a port used to control coprocessor command timing.

BACKGROUND

Mailing machines including postage metering systems are known in the art including the DM SERIES of mailing machines available from Pitney Bowes Inc. of Stamford, Conn. A postage metering system applies evidence of postage, commonly referred to as postal indicia, to an envelope or other mail piece (directly or on a label to be applied thereto) and accounts for the value of the postage dispensed.

The modern postage metering systems typically employ one or more microprocessors for general mailing machine control and a secure postal security device (PSD) coprocessor for accounting for postage funds transactions. When controlling an inkjet printer, the main microprocessor may write out columns of indicium data to the inkjet printer subsystem. The main microprocessor may also interface with the PSD to initiate postage accounting and cryptographic co-processing functions as required.

In personal computer math coprocessor systems such as the INTEL387SX processor, the CPU would synchronize transfer of commands and data to the coprocessor using busy status lines. When the coprocessor has the necessary data, it then executes in parallel to the main CPU. The main CPU may then loop to waste instructions while waiting for the coprocessor to be ready to accept additional instructions and/or data required. A WAIT command may be used to synchronize operand transfer.

Accordingly, there is a need for a coprocessor synchronization system that does not waste main processor resources.

SUMMARY

The present application describes illustrative embodiments of a coprocessor system for using a main microprocessor DMA channel to write to a port to control a coprocessor system and more particularly in certain coprocessor system embodiments to using a main CPU counter to trigger a DMA channel to perform a single byte transfer to a port used to control coprocessor command timing.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Figure 1:
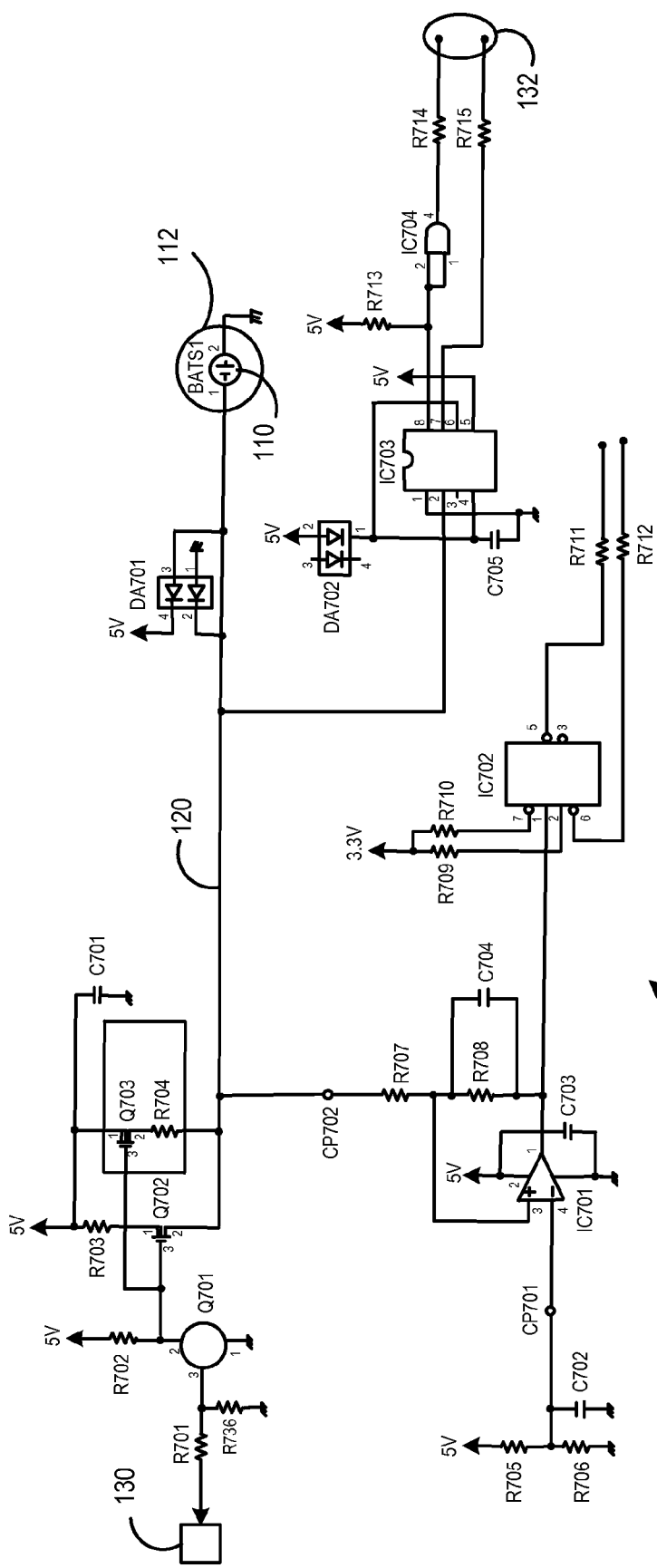
FIG. 1 is a partial schematic of a multiple processor system including a main CPU and a coprocessor according to an illustrative embodiment of the present application.

The illustrative embodiments of the present application describe a coprocessor system for using a main microprocessor DMA channel to write to a port to control a coprocessor system and more particularly in certain coprocessor system embodiments to using a main CPU counter to trigger a DMA channel to perform a single byte transfer to a port used to control coprocessor command timing.

Certain coprocessor devices such as the IBUTTON processor available from Maxim Integrated Products, Inc. of Sunnyvale, Calif. use a serial bus that multiplexes data and power. Commands such as the start program release sequence require that a strong pull-up signal be asserted during a time window after the command is sent to the 1WIRE bus using the UART channel of the main CPU and the serial to 1WIRE controller DS2480B circuit. The illustrative embodiments described herein are described with reference to a multiprocessor system in a mailing machine have an SH3 7720 main CPU and an IBUTTON coprocessor used for cryptographic processes and postage accounting. However, the embodiments may be useful in other coprocessor synchronization systems.

In certain synchronization systems, the main CPU is forced to wait until the coprocessor command must be asserted such as by using a delay loop. The illustrative embodiments described herein free the main CPU for other tasks by using a timer and DMA channel configured to provide the necessary delayed command control signal. An example of a 1WIRE interface is shown in DALLAS Semiconductor Application Note 192 entitled using the DS2480B Serial 1-Wire Line Driver, incorporated herein by reference.

In a mailing machine, the timing required to securely print columns of postage indicium data may be a critical parameter. The column data processing is typically controlled by interrupts generated by the feed path transport encoder pulses that track the mail piece through the mailing machine printer transport. In a mailing machine that requires high throughput for franking mail pieces, it may be necessary to initiate a coprocessor postage debit operation while the previous postage indicium is still printing as controlled by the main CPU.

To setup the next debit operation, the main CPU must initiate communication with the coprocessor IBUTTON using the 1WIRE interface. The 1WIRE interface uses a non-duplex bidirectional communications bus that also carries power in a multiplexing scheme while using only one data wire and a ground. The 1WIRE bus has strict timing requirements when changing the direction of communication. In order to switch direction and have the IBUTTON coprocessor process the command that was just sent by the main CPU, the system is required to assert a strong pull-up on the 1WIRE bus line. The assertion of the strong pull-up signal requires assertion in a time window in order to be properly recognized by the IBUTTON.

In another mailing machine system, the main processor execution control was used to provide a deterministic and precise delay for setting of the required strong pull-up signal. During the delay wait loop utilized, all main CPU processor interrupts had to be disabled to ensure the count was not disturbed. Such a main execution branch delay wasted computing power that could be used elsewhere such as in controlling the secure print operations. If the main CPU control branch scheme was utilized and the system speed increased, indicium print failures could be induced due to delays in processing column print data.

The embodiments described herein provide an advantageous solution by using a direct memory access (DMA) channel and a compare match timer (CMT) in the main SH3 CPU to provide correct timing for the strong pull-up coprocessor control signal. The scheme utilized does not require that the main CPU interrupts be disabled. The CMT is used to count down to provide a precise window after the command is sent to the 1WIRE interface device along the UART channel to later assert the control signal to provide the properly delayed strong pull-up. Since only one of the four available DMA channels were in use by the mailing machine, a spare DMA channel was available for this purpose. An SH3 I/O port was connected to the strong pull-up circuitry. The CMT was then set using an appropriate constant based upon the CPU clock to provide the required delay count. The CMT then triggered the DMA channel to write a single byte to that SH3 port with the appropriate bit set in that control memory byte to trigger the strong pull-up control signal.

While it might seem counter-intuitive to utilize a DMA channel to write a single control byte to a port, such a scheme provides advantages as discussed herein. The proper constant was determined empirically, but other calculations methods may be used to provide the appropriate timing delay. Other than setting up the DMA channel and the CMT, the scheme utilized does not require additional intervention by the main CPU which is then free for other processing tasks such as secure print control.

Referring to FIG. 1, a partial schematic of a multiple processor system 100 including a main CPU and a coprocessor 110 according to an illustrative embodiment of the present application is shown. The main processor UART output interfaces at 132. The main processor SH3 7720 port K, bit 2 130 is configured for asserting the strong pull-up control signal. The main processor SH3 7720 port K, bit 2 130 is configured for asserting the strong pull-up control signal and is connected through resistor R701 to Q701, a RK7002A MOSFET small signal transistor that is operatively connected to resistors R736 and R702 to switch Q702, a IRLMS6702 HEXFET power MOSFET that provides the strong pull-up signal from +5V through R703. In an alternative, optional switch Q703, an NTR4502P power MOSFET transistor through resistor R704 in parallel with the Q702 circuit. The strong pull-up may then be asserted onto node 120, the 1WIRE bus node connected to the IBUTTON coprocessor 110 that is installed in socket 112. The 1WIRE node is accessible using Control Port CP702.

The SH3 SH7720 Main CPU UART is connected at 132. UART bus 132 is interfaced through the 1WIRE bus controller IC703 140, a DS2480B Serial to 1WIRE Line Driver to the 1WIRE bus 120 in order to connect to the IBUTTON socket 112 and the IBUTTON coprocessor 110. A voltage divider consisting of R705 and R706 develops a voltage on the node accessible at control port CP701 input to IC701, an LMC7211 CMOS comparator driving the clock input of IC702, an NC7SZ74K8X CMOS Flip Flop to produce signals regarding the IBUTTON coprocessor including IBUTTON_DONE and IBUTTON_INT_EN.

In another mailing machine, the UART bus was used to send an IBUTTON command to the 1WIRE bus and then the main CPU would enter a wait loop with all interrupts off to provide a tuned delay before asserting the required coprocessor control strong pull-up signal in proper synchronization. In the illustrative embodiments described herein, the main CPU UART was used to send the command instruction and it then sets up the CMT timer. The main CPU is then free to perform other tasks since the CMT timer will trigger the DMA channel to provide a synchronized coprocessor command signal to provide the required strong pull-up signal.

Figure 2:
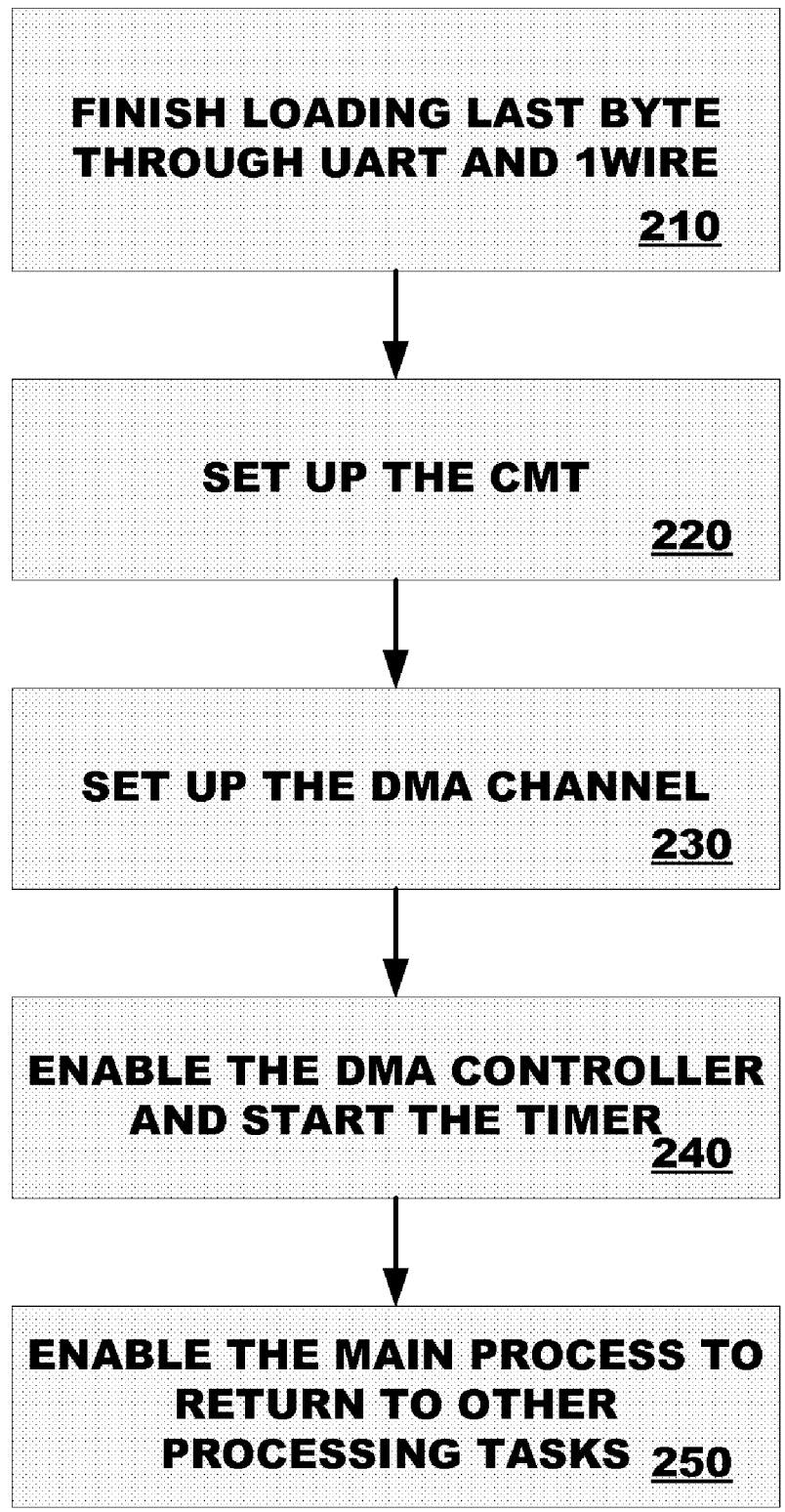
FIG. 2 is a flowchart of an illustrative process for synchronizing commands in a co-processing environment using a DMA channel according to an illustrative embodiment of the present application.

Referring to FIG. 2, a flowchart of an illustrative process for synchronizing commands in a co-processing environment using a DMA channel according to an illustrative embodiment of the present application is shown. The Mar. 22, 2005 SH7720 Hardware Manual available from Renesas Technology America, Inc. of San Jose, Calif. is incorporated by reference.

In the illustrative process 200, a sequence of steps for asserting the strong pull-up bit for the IBUTTON communication is described. After loading the last byte to be transmitted to the IBUTTON through the UART and 1WIRE interface circuit in step 210, the system sets up the number 4 compare match timer (CMT) along with the number 4 channel of direct memory access (DMA) to perform the strong pull-up operation at the correct time.

In step 220, the system sets up the CMT for single shot operation as a 32-bit counter triggering a DMA operation using the peripheral clock divided by 8 as a clock source using the SH3 7720 register CMCSR4. The system then clears the initial count register to zero (CMCNT4). The system then loads the constant register value that will trigger the DMA operation when the count register (CMCNT4) matches the constant value (CMCOR4). The constant value was determined empirically using a logic analyzer and verified through calculation.

In step 230, the system then sets up the channel 4 DMA to perform a single byte transfer when the channel 4 CMT triggers (CHCR_4) incrementing both the source and destination registers by 1 and to interrupt the system when the transfer is complete. The system then loads the DMA source register (SAR_4) with the RAM stored variable that contains the value to be written to the destination port (DAR_4) that controls the strong pull-up. Here the constant byte wide bit mask must set port K, bit 2. The system pre-reads the port that it will write after setting the bit that controls the strong pull-up. With those parameters set, in step 240, the system then enables the DMA controller and starts the timer. The system main CPU is then free for other tasks as shown in step 250.

While several embodiments of the invention have been described and illustrated above, it should be understood that these are exemplary of the invention and are not to be considered as limiting. Additions, deletions, substitutions, and other modifications can be made without departing from the spirit or scope of the present invention. In addition, the concepts of the present invention are not limited to application in the area of postal indicia printing, but may also be used in connection with other devices benefiting from the teachings herein. Accordingly, the invention is not to be considered as limited by the foregoing description.

We claim:
1. A coprocessor system comprising:
  a main central processing unit (CPU) having at least one direct memory access (DMA) channel, at least one timer and at least one port configured to control a coprocessor;
a bus operatively connecting a main CPU communication port of the main CPU with a communication port of the coprocessor, wherein the main CPU is programmed to initiate the at least one timer that is utilized to trigger the at least one DMA channel to cause it to write a control byte to the at least one port and after such initiation, the main CPU is programmed to return to other tasks.

2. The system of claim 1, wherein,
the at least one port drives a coprocessor command synchronization circuit.

3. The system of claim 2, wherein,
the coprocessor command synchronization circuit provides a strong pull-up signal to the communication port of the coprocessor.

4. The system of claim 3, wherein,
the communication port of the coprocessor comprises a 1WIRE interface.

5. The system of claim 1, wherein,
the at least one timer is a one shot timer configured to count for a predetermined time using a constant value.

6. The system of claim 2, wherein,
the DMA channel is configured to write a single byte to the main CPU communication port including a bit mask to control the coprocessor command synchronization circuit by providing a command timing signal.

7. The system of claim 6, further comprising, the main CPU including at least one or more interrupts and wherein each of the at least one or more interrupts is not disabled after such initiation.

* * * * *